(12) United States Patent
Oscarsson et al.

(10) Patent No.: US 10,703,445 B2
(45) Date of Patent: Jul. 7, 2020

(54) SYSTEM FOR SOURCE TOWING AT DEPTH

(71) Applicant: PGS Geophysical AS, Oslo (NO)

(72) Inventors: Mattias Oscarsson, Oslo (NO); Thomas Hvesser, Oslo (NO)

(73) Assignee: PGS Geophysical AS, Oslo (NO)

( * ) Notice: Subject to any disclaimer, the term of this patent is extended or adjusted under 35 U.S.C. 154(b) by 102 days.

(21) Appl. No.: 15/874,621

(22) Filed: Jan. 18, 2018

(65) Prior Publication Data

US 2018/0244350 A1     Aug. 30, 2018

Related U.S. Application Data

(60) Provisional application No. 62/463,074, filed on Feb. 24, 2017.

(51) Int. Cl.

| | |
|---|---|
| *G01V 1/38* | (2006.01) |
| *B63B 13/00* | (2006.01) |
| *B63B 21/66* | (2006.01) |
| *G01V 1/28* | (2006.01) |
| *G01V 3/15* | (2006.01) |

(52) U.S. Cl.
CPC ............ *B63B 13/00* (2013.01); *B63B 21/66* (2013.01); *G01V 1/28* (2013.01); *G01V 1/3817* (2013.01); *G01V 1/3843* (2013.01); *G01V 3/15* (2013.01); *B63B 2207/02* (2013.01); *B63B 2211/02* (2013.01)

(58) Field of Classification Search
CPC .. G01V 1/3817; G01V 1/3826; G01V 1/3835; G01V 1/3843; G01V 1/3852; B63G 8/22
See application file for complete search history.

(56) References Cited

U.S. PATENT DOCUMENTS

| | | | |
|---|---|---|---|
| 7,957,220 B2 | 6/2011 | Howlid et al. | |
| 8,139,443 B2 | 3/2012 | Armstrong | |
| 8,570,829 B2 | 10/2013 | Hovland et al. | |
| 9,395,461 B2 | 7/2016 | Hovland et al. | |
| 9,508,915 B2 | 11/2016 | Oscarsson | |
| 9,606,252 B2 | 3/2017 | Oscarsson et al. | |
| 9,921,327 B2* | 3/2018 | Aaker .................. | G01V 1/3817 |
| 2008/0019214 A1 | 1/2008 | Pramik | |

(Continued)

OTHER PUBLICATIONS

European Search Report for Application No. 18158315.4, dated Aug. 1, 2018, 7 pages.

(Continued)

*Primary Examiner* — Andrew Polay
(74) *Attorney, Agent, or Firm* — Patterson & Sheridan, LLP

(57) ABSTRACT

An apparatus for towing geophysical sources includes a housing; a first geophysical source disposed in the housing so that the first geophysical source is partially exposed to a surrounding environment; and a plurality of ballast tanks coupled to the housing and configured to at least one of: change a buoyancy of the source towing system; and shift a center of mass of the source towing system. A method of towing a geophysical source includes towing a source towing system through a body of water at a towing depth; and operating a plurality of ballast tanks of the source towing system to at least one of: change a buoyancy of the source towing system; and shift a center of mass of the source towing system.

20 Claims, 4 Drawing Sheets

(56) References Cited

U.S. PATENT DOCUMENTS

| | | |
|---|---|---|
| 2013/0182531 A1 | 7/2013 | Gagliardi et al. |
| 2013/0242694 A1 | 9/2013 | Wu |
| 2015/0177398 A1 | 6/2015 | Oscarsson et al. |
| 2016/0061981 A1 | 3/2016 | Long |
| 2016/0107735 A1* | 4/2016 | Nasuno .................... B63G 8/22 |
| | | 114/333 |
| 2016/0223696 A1* | 8/2016 | Josse .................... G01V 1/3808 |
| 2016/0259072 A1 | 9/2016 | Richer De Forges et al. |

OTHER PUBLICATIONS

Geospectrum Technologies Inc Brochure, Modular Projector System, Copyright 2016.

* cited by examiner (PRIOR ART)

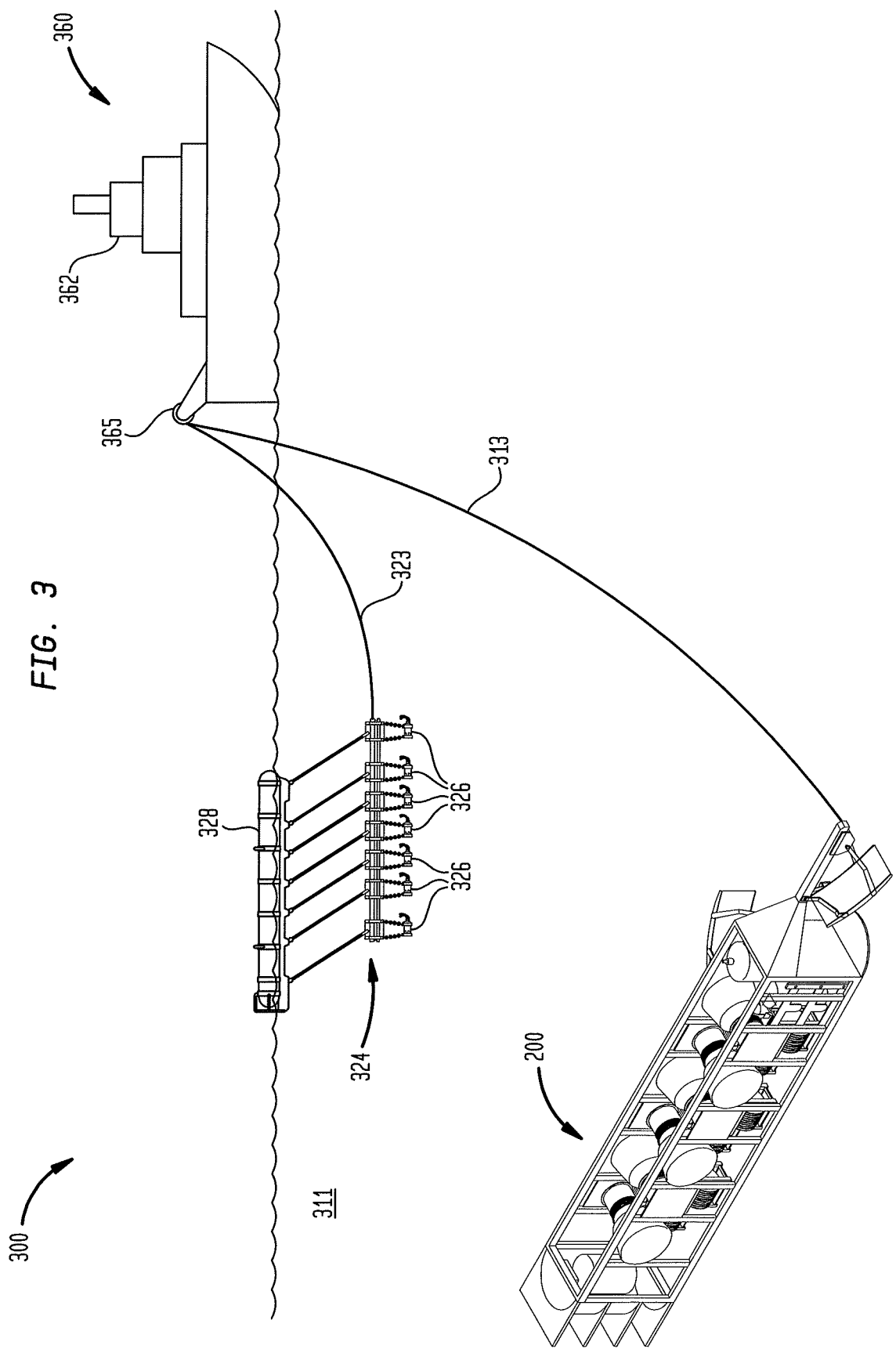

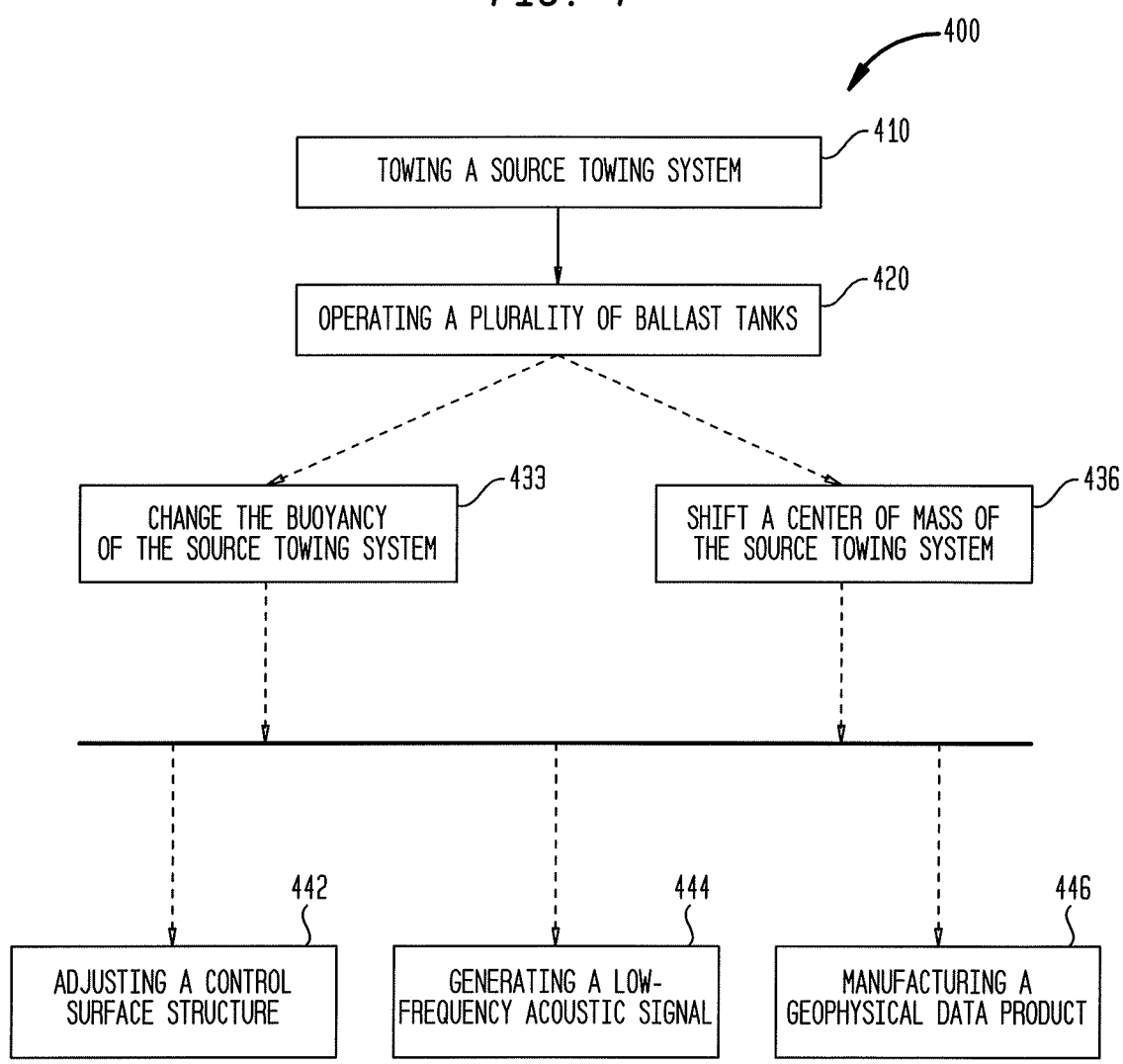

SYSTEM FOR SOURCE TOWING AT DEPTH

BACKGROUND OF THE INVENTION

This disclosure is related generally to the field of marine surveying. Marine surveying can include, for example, seismic and/or electromagnetic surveying, among others. For example, this disclosure may have applications in marine surveying in which one or more geophysical sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data which can be useful in the discovery and/or extraction of hydrocarbons from subsurface formations.

Historically, geophysical sources have been towed at or near the water surface. Flotation and towing systems have positioned the sources vertically (i.e., water depth), laterally (i.e., in the cross-line direction; horizontal and perpendicular to the local towing direction), and axially (i.e., in the in-line direction; horizontal and parallel to the local towing direction). Near-surface towing has provided easy access for power and data transfer. Also air gun signals (e.g., bubbles) may be attenuated by higher water pressures at greater depths. However, deep towing of sources may provide better data quality in many instances. For example, deep towing of sources may reduce source ghosting concerns. As is commonly known, acoustic energy that is reflected downwardly from the water surface is commonly known as a "ghost" signal. This causes a sequence of notches in the acquired data spectrum, including a notch at zero frequency (0 Hz). The frequencies of these notches in the detected acoustic signal are related to the depth at which the geophysical source is towed. Low-frequency data acquisition may be improved by towing the sources at a greater depth. However, this causes the ghost notches in the spectrum to occur at lower frequencies, and hence limits the high frequency parts of the spectrum needed for high resolution imaging of shallower targets. Also, when using air gun(s) as a seismic energy source, the fundamental frequency of the gun(s) increases with increasing depth. Hence, the increase in energy in the low frequency end when towing the air-guns deeper due to the source ghost, is counteracted by the increase in fundamental frequency of the air-gun(s).

In some instances, surface obstructions impede shallow towing of sources. At times, data may be desired from sources at more than one depth and/or horizontal position. Towing systems may sometimes suffer from vibration or other sources of noise. It would be beneficial to steer sources and/or source arrays in conjunction with and/or independently of existing flotation and towing systems.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 illustrates a geophysical survey system according to embodiments of this disclosure.

FIG. 4 is a flowchart of a method of source towing at depth with the source towing system of FIG. 2.

DETAILED DESCRIPTION

Figure 1:
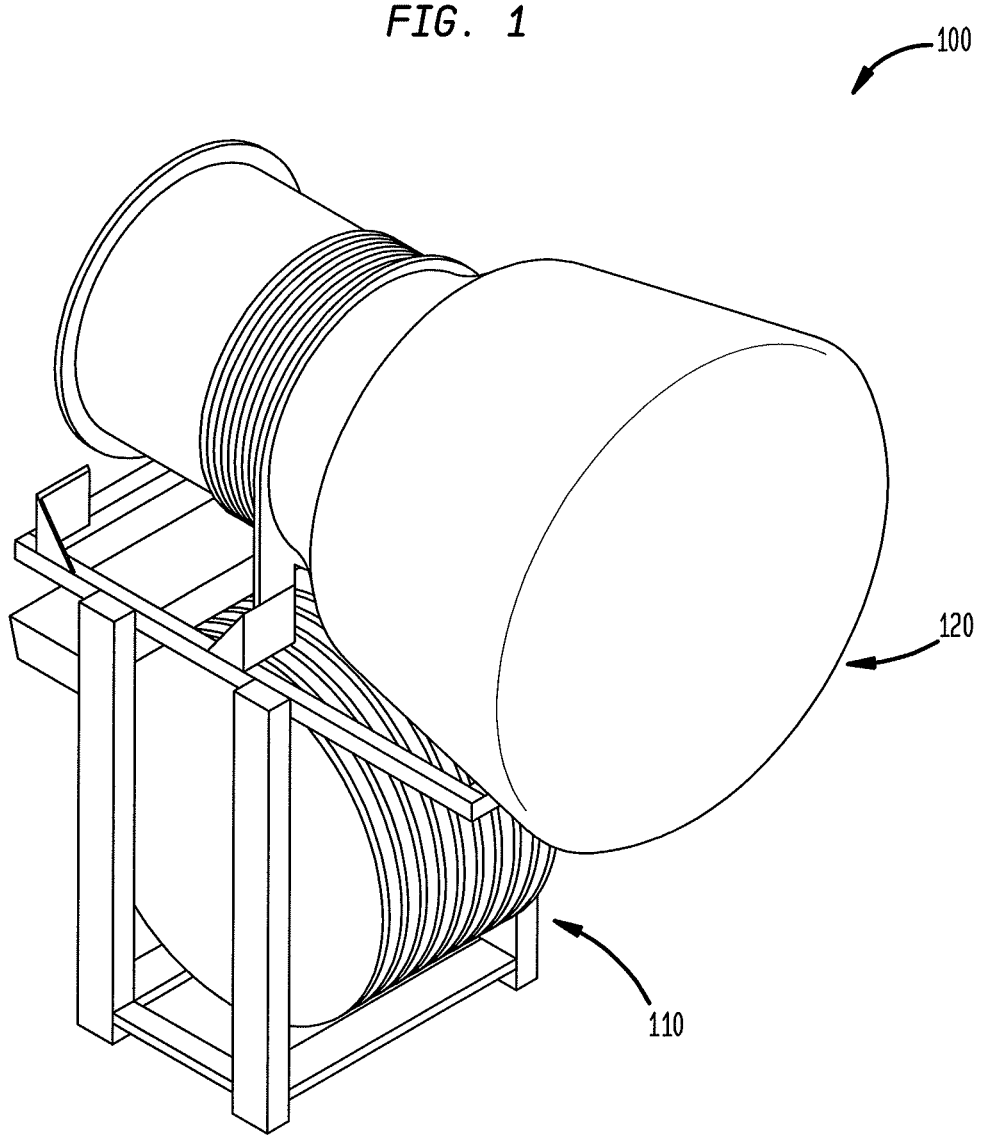
FIG. 1 illustrates a bender source.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial direction" shall mean the in-line towing direction of an object or system.

"Lateral direction" shall mean the cross-line towing direction of an object or system.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Buoyancy" of an object shall refer to buoyancy of the object taking into account any weight supported by the object.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

If there is any conflict in the usages of a word or term in this specification and one or more patent or other documents that may be incorporated herein by reference, the definitions that are consistent with this specification should be adopted for the purposes of understanding this invention.

The present invention generally relates to marine survey methods and apparatuses, and, at least in some embodiments, to novel depth towing systems for marine geophysical sources and associated methods of use. One of the many potential advantages of the embodiments of the present disclosure includes the potential for deep towing of sources, and/or towing sources at multiple depths. Another potential advantage includes the potential for controlling the buoyancy of a source towing system to aid with deployment and recovery of the system. Another potential advantage includes the potential for controlling the lateral force on a source towing system to reduce entanglement risks during operations, deployment and/or recovery of the system. Embodiments of the present disclosure can thereby be useful in the discovery and/or extraction of hydrocarbons from subsurface formations.

Marine geophysical sources generally include seismic sources and electromagnetic sources. Seismic sources generally include impulse sources (e.g., air guns) and sustained acoustic sources (e.g., benders and marine vibrators). Electromagnetic sources generally include electrode pairs and magnetic loops. For simplicity, the following description will address bender sources, but various types of marine geophysical source may be considered with the disclosed equipment and methods.

Bender sources may be towed individually or in an array. It may be beneficial to tow a bender source and/or an array of bender sources such that the towing depth may be controlled. It may be beneficial to tow an array of bender sources such that the array may be able to rotate around a towing axis, for example to keep the array level.

FIG. 1 illustrates an exemplary bender source 100. Bender source 100 includes a plurality of benders 110 (e.g., flexural disc projectors). A bender 110 is generally a sound projector (e.g., a low-frequency sound projector). By incorporating a number of benders 110, bender source 100 may generate a sustained acoustic signal (e.g., a low-frequency signal) by utilizing a small displacement over a large surface area (i.e., the combined surface area of each of the benders 110). For example, a low-frequency bender source 100 may be capable of generating an acoustic signal of between about 0.05 Hz and about 10 Hz. In some embodiments, bender source 100 may be capable of generating an acoustic signal of between about 1 Hz and about 5 Hz when operated at a towing depth of between about 50 m and about 150 m. In some embodiments, voltage-controlled piezoelectric ceramic plates may cause bending of the surface area of a bender 110. The individual acoustic displacements of each of the benders 110 may be consolidated to be broadcast from the projector 120 of bender source 100.

Figure 2:
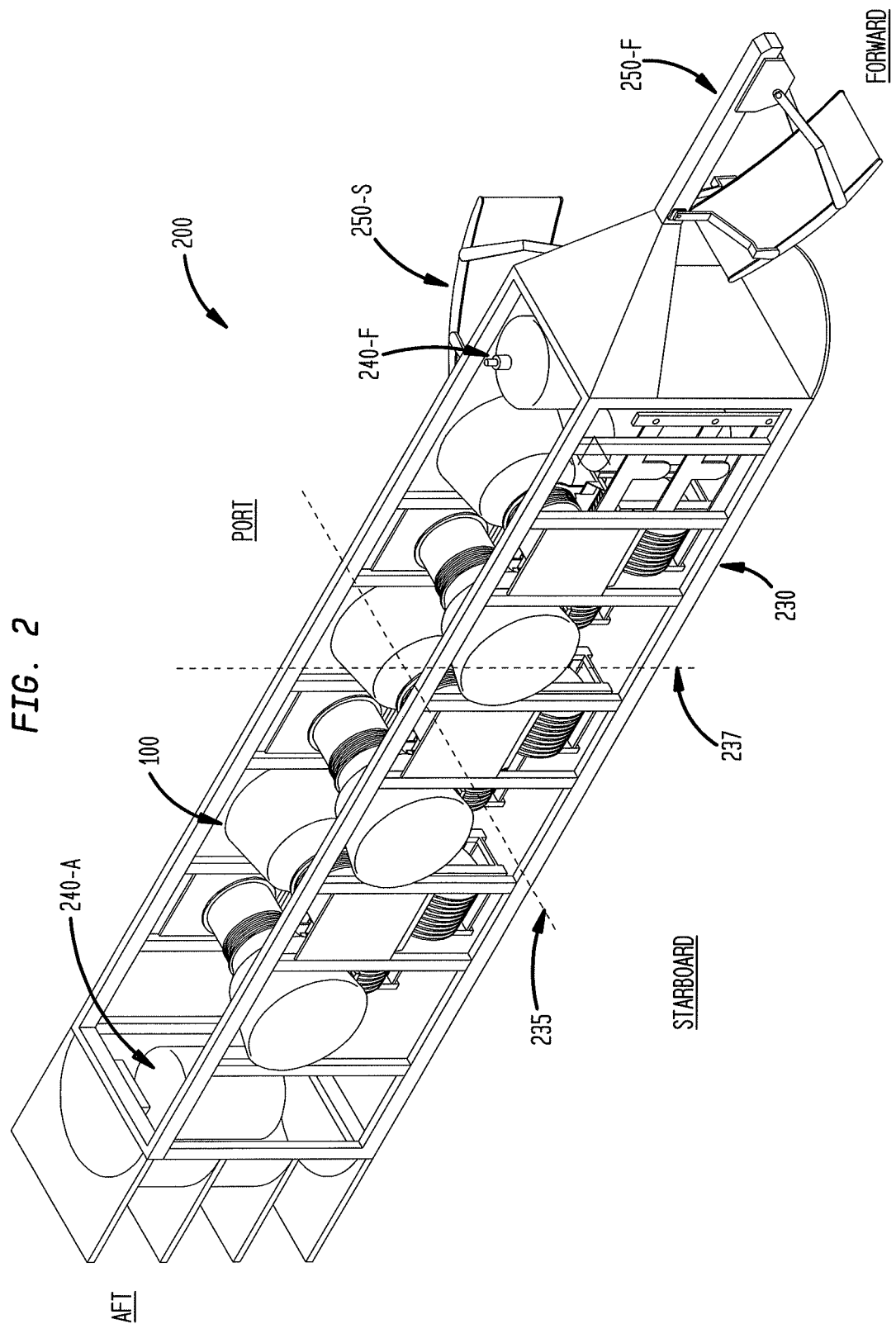
FIG. 2 illustrates a source towing system according to embodiments of this disclosure.

FIG. 2 illustrates an exemplary source towing system 200 for an array of bender sources 100. The source towing system 200 generally includes a housing 230 for holding the bender sources 100. The housing 230 may provide structural support for the bender sources 100. The housing 230 may locate the various bender sources 100 in an array that extends along the axial direction. As illustrated, source towing system 200 includes six bender sources 100 aligned in housing 230 in the axial direction, and alternating between facing the port direction and facing the starboard direction. In some embodiments, source towing system 200 may include an array of bender sources 100 having multiple bender sources 100 in the vertical direction and/or in the lateral direction. Housing 230 may be a framework, for example partially exposing the bender sources 100 to the surrounding environment (e.g., water). In some embodiments, the axial length of source towing system 200 may be between about 1 m and about 15 m, or between about 6 m and about 12 m. In some embodiments, the lateral width of source towing system 200 may be between about 0.5 m and about 2 m. In some embodiments, the height of source towing system 200 may be between about 1 m and about 5 m, or between about 2 m and about 3 m.

Also illustrated in FIG. 2, source towing system 200 may include one or more ballast tanks 240. The ballast tanks 240 may be coupled to the housing 230. In some embodiments, ballast tanks 240 may be disposed in housing 230. In some embodiments, ballast tanks 240 may be partially exposed to the surrounding environment. Operation of the ballast tanks 240 may change the buoyancy of source towing system 200 and/or shift the center of mass of source towing system 200. The volume of the ballast tanks 240 may be selected so that flooding the ballast tanks 240 with water will cause the source towing system 200 to sink, while filling the ballast tanks 240 with air will cause the source towing system 200 to float. For example, each ballast tank 240 may provide on the order of about 1 ton of ballast for source towing system 200. In some embodiments, each ballast tank 240 may have a volume on the order of about 1 $m^3$. At times, ballast tanks 240 may be partially flooded with water and/or partially filled with air, thereby changing the buoyancy of source towing system 200. As used herein, unless explicitly stated otherwise, "sink" does not imply changing the towing depth to be at or near the sea floor, but only a decrease in the buoyancy. As used herein, unless explicitly stated otherwise, "float" does not imply changing the towing depth to be at or near the sea surface, but only an increase in the buoyancy.

In some embodiments, ballast tanks 240 may be distributed symmetrically within and/or on housing 230. For example, ballast tanks 240 may be symmetrically distributed about a cross-line axis 235. In some embodiments, cross-line axis 235 may be a neutral center of mass axis, such that cross-line axis 235 extends through the center of mass of source towing system 200 when the ballast tanks 240 are equally filled. In some embodiments, a forward ballast tank 240-F may be located in a forward section of housing 230, and an aft ballast tank 240-A may be located in an aft section of housing 230. In some embodiments, a central ballast tank (not shown) may be located near the neutral center of mass of source towing system 200.

Each ballast tank 240 may be independently operable. At times, for example, forward ballast tank 240-F may be flooded with more water than aft ballast tank 240-A, thereby shifting the center of mass of source towing system 200 forwards. Likewise, at times, forward ballast tank 240-F may be flooded with less water than aft ballast tank 240-A, thereby shifting the center of mass of source towing system 200 aftwards. In some embodiments, the ballast tanks 240 may be operated in a coordinated fashion. At times, for example, forward ballast tank 240-F and aft ballast tank 240-A may both be flooded with water, thereby maintaining the center of mass of source towing system 200, while causing the source towing system 200 to sink. Likewise, at times, forward ballast tank 240-F and aft ballast tank 240-A may both be filled with air, thereby maintaining the center of mass of source towing system 200, while causing the source towing system 200 to float. At times, the buoyancy of source towing system 200 may be increased by at least partially filling the ballast tanks 240 with air to aid in recovery of source towing system 200. At times, the buoyancy of source towing system 200 may be decreased by at least partially flooding the ballast tanks 240 with water to aid in deployment of source towing system 200.

Also illustrated in FIG. 2, source towing system 200 may include one or more control surface structures 250. Each control surface structure 250 may be independently operable and/or adjustable. In some embodiments, the control surface structures 250 may be operated in a coordinated fashion.

Control surface structures 250 may include support structures, actuators, and exposed surface area(s). The support structures and actuators may adjust the facing direction, articulation angle(s), and/or curvature of the exposed surface area(s). In some embodiments, source towing system 200 may include a forward control surface structure 250-F that may be operable to adjust the pitch angle of source towing system 200. As used herein, the "pitch" angle of the source towing system 200 may be understood to be an angle about a cross-line axis 235 that extends through the neutral center of mass of source towing system 200. Adjusting forward control surface structure 250-F may adjust the downforce on source towing system 200. In some embodiments, source towing system 200 may include one or more side control surface structures, such as side control surface structure 250-S, that may be operable to adjust the yaw angle of source towing system 200. As used herein, the "yaw" angle of the source towing system 200 may be understood to be an angle about a vertical axis 237 that extends through the neutral center of mass of source towing system 200. Adjusting side control surface structure 250-S may adjust the lateral force on source towing system 200.

FIG. 3 illustrates an exemplary geophysical survey system 300 that may be used with source towing system 200. The geophysical survey system 300 includes a survey vessel 360 that moves along the surface of a body of water 311 such as a lake or the ocean. The survey vessel 360 includes thereon equipment, shown generally at 362 and described for convenience herein as a "recording system" that may include (none shown separately) data recorders, navigation devices such as global positioning system ("GPS") receivers, and source energy source control devices. The recording system 362 may also include equipment for operating buoyancy control devices (e.g., ballast tanks 240) and/or hydrodynamic force devices (e.g., control surface structures 250) on one or more source towing systems 200.

The source towing system 200 may be towed by the survey vessel 360 using an umbilical cable 313. In some embodiments, the source towing system 200 may be towed at a towing depth of between about 50 m and about 150 m. The umbilical cable 313 may include (none shown separately) a strength member to transfer towing force of the survey vessel 360 to the source towing system 200, one or more compressed air or gas lines, and electrical and/or optical conductors for communication between various components of the source towing system 200 and the recording system 362. As illustrated in FIG. 3, source towing system 200 may typically be towed without being coupled to a surface float (e.g. flotation device 328). In some embodiments, survey vessel 360 may tow multiple (e.g., two, three, four or more) source towing systems 200. For example, additional bender sources 100 may generate a more powerful geophysical source signal. In some embodiments, each source towing system 200 would have its own umbilical cable 313. In some embodiments, spreader ropes and/or paravanes may be utilized with the multiple umbilical cables 313 to maintain lateral separation between the source towing systems 200. In some embodiments, control surface structures 250 may be used on one or more of the source towing systems 200 to maintain lateral separation therebetween. In some embodiments, the multiple source towing systems 200 may have different towing depths. For example each source towing system 200 may have an umbilical cable 313 of a different length to maintain depth separation of the source towing systems 200. In some embodiments, ballast tanks 240 and/or control surface structures 250 may be used on one or more of the source towing systems 200 to adjust the buoyancy, and thereby maintain depth separation therebetween.

An aft end of umbilical cable 313 may be coupled to source towing system 200, and a forward end of umbilical cable 313 may be coupled to a winch 365 on survey vessel 360. Winch 365 may assist in depth control of the source towing system 200. The winch 365 may communicate with and/or be controlled by recording system 362. For example, recording system 362 may signal the winch 365 to extend (retract) the umbilical cable 313, thereby increasing (decreasing) the towing depth of source towing system 200. As another example, as the speed of survey vessel 360 increases (decreases), the towing depth of source towing system 200 may decrease (increase). Consequently, recording system 362 may coordinate winch 365 to extend (retract) umbilical cable 313 as the speed of survey vessel 360 increases (decreases) to maintain a uniform towing depth of source towing system 200. In some embodiments, winch 365 may be considered to provide "coarse" control of the towing depth of source towing system 200. This is in contrast to the "fine" control of towing depth of source towing system 200 that may be provided by ballast tanks 240 and/or control surface structures 250.

The survey vessel 360 may also tow, or another vessel (not shown) may tow, one or more shallow source arrays 324. The shallow source array 324 may be towed by the survey vessel 360 using an umbilical cable 323, similar to umbilical cable 313. The shallow source array 324 typically includes a plurality of energy sources 326 suspended from one or more flotation devices 328. The shallow source array 324 may include conventional geophysical energy sources (e.g., air guns). The towing depth of the shallow source array 324 may be less than that of source towing system 200. For example, the shallow source array 324 may be towed at conventional source towing depths. In some embodiments, the towing depth of the shallow source array 324 may be between about 6 m and about 50 m, or between about 10 m and about 20 m.

In some embodiments, geophysical sensors (e.g., seismic sensors and/or electromagnetic sensors) may be towed on streamers by survey vessel 360. In some embodiments, geophysical sensors may be towed on streamers by another vessel. In some embodiments, geophysical sensors may be located at or near the bottom of body of water 311 (e.g., on ocean bottom nodes). Geophysical data may be acquired by the geophysical sensors. For example, during data acquisition operations, bender sources 100 in source towing system 200, and optionally energy sources 326 in shallow source arrays 324, generate energy (e.g., wavefields, pulses, acoustic signals), and the geophysical sensors receive the energy generated by the geophysical sources and possibly affected by interaction with subsurface formations. At times, geophysical data may be acquired simultaneously with operation of the ballast tanks 240. For example, bender source 100 may generate an acoustic signal at the same time that forward ballast tank 240-F is being flooded with water to shift the center of mass of source towing system 200 forward. As another example, bender source 100 may generate an acoustic signal at the same time that each of the ballast tanks 240 is being filled with air to float the source towing system 200. At times, geophysical data may be acquired simultaneously with adjusting the exposed surface areas of control surface structures 250. For example, bender source 100 may generate an acoustic signal at the same time that forward control surface structure 250-F is adjusted to adjust the pitch angle of source towing system 200. As another example, bender source 100 may generate an acoustic signal at the same time that side control surface structure 250-S is being adjusted to adjust the yaw angle of source towing system 200. The methods and systems described herein may be used to manufacture a geophysical data product indicative of certain properties of a subterranean formation. The geophysical data product may include geophysical data such as pressure data, particle motion data, particle velocity data, particle acceleration data, and any seismic image that results from using the methods and systems described above. The geophysical data product may be stored on a non-transitory computer-readable medium as described above. The geophysical data product may be produced offshore (i.e., by equipment on the survey vessel 360) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

In accordance with a number of embodiments of the present disclosure, a geophysical data product may be produced. Geophysical data may be acquired by utilizing source towing system 200 with geophysical sensors, such as seismic sensors, electromagnetic sensors, depth sensors, location sensors, etc. The geophysical data may subsequently be obtained (e.g., retrieved from a data library) and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore.

Geophysical survey system 300 may also include a variety of sensors, actuators, controllers, and data processors. Geophysical survey system 300 may utilize the sensors, actuators, controllers, and data processors to measure and/or adjust the depth, axial position, lateral position, and/or orientation of source towing system 200. For example depth and/or pressure sensors may be coupled to source towing system 200. Data from the depth and/or pressure sensors may be utilized to determine whether the buoyancy of source towing system 200 should be adjusted. As another example, tilt sensors (e.g., gyroscopes) may be coupled to source towing system 200. Data from the tilt sensors may be utilized to determine the amount of rotation of source towing system 200 about vertical axis 237 and/or cross-line axis 235. If the amount of rotation about either of these axes exceeds a selected threshold amount, control surfaces may be adjusted, ballast tanks may be operated, and/or umbilical cable lengths may be adjusted to bring the rotation back into planned parameters. As another example, tension sensors (e.g., a load cell) may be coupled to umbilical cable 313. Data from tension sensors may be utilized to determine whether a length of umbilical cable 313 should be adjusted. As further example, possible types of sensors may include temperature sensors, salinity sensors, acoustic pingers, etc. In some embodiments, acoustic pingers may be disposed at various locations on geophysical survey system 300 (e.g., on source towing system 200, on survey vessel 360, on one or more streamers, on paravanes or other streamer towing equipment, on other vessels, buoys or other equipment) to provide relative positioning information. In some embodiments, a controller, such as a microprocessor, may accept as input measurements from one or more of the tilt sensors, depth sensors, and/or pressure sensors. The controller may be in signal communication with the recording system 362.

In some embodiments, operation of ballast tanks 240 may be controlled by a buoyancy controller. The buoyancy controller may operate automatically, in response to measurements made from a depth sensor, a pressure sensor, a load cell, and/or a tilt sensor. The buoyancy controller may be coupled to a valve (e.g., a solenoid operated three-way pneumatic control valve). When data from one or more of the sensors indicate that the buoyancy should be increased, the buoyancy controller may operate the valve to couple a source of compressed air or gas to the interior volume of the ballast tanks 240. Pressurized gas from the compressed gas source may displace water in the interior volume, thereby increasing the buoyancy of the source towing system 200. When the correct buoyancy has been attained, the buoyancy controller may operate the valve to close, thereby maintaining the water level in the interior volume of the ballast tanks 240. In case buoyancy is required to be decreased, the buoyancy controller may operate the valve to vent the ballast tanks 240, so that water can enter the interior.

The buoyancy controller may be programmed to operate the valve to maintain the source towing system 200 at selected depth in the water. For example, a uniform depth may be maintained during a data acquisition operation. Typical planned towing depths may range from about 10 m to about 200 m, or in some embodiments from about 50 m to about 150 m. It may be beneficial to maintain a towing depth of at least about 50 m to reduce or eliminate source ghost notches when utilizing a low-frequency seismic source.

At times, it may be desirable to change the towing depth of source towing system 200 before, during, and/or after data acquisition. For example, it may be desirable to increase the towing depth of the source towing system 200 to avoid hazards in the water surface (such as ice). Consequently, the towing depth may be increased by one or more of (1) at least partially flooding the ballast tanks 240 with water, (2) adjusting the exposed surface area of forward control surface structure 250-F to adjust the pitch angle downwards, (3) lengthening the umbilical cable 313, and (4) slowing the speed of survey vessel 360. The source towing system 200 may be returned to the selected towing depth after the hazard has passed by one or more of (1) at least partially filling the ballast tanks 240 with air, (2) adjusting the exposed surface area of forward control surface structure 250-F to adjust the pitch angle upwards, (3) shortening the umbilical cable 313, and (4) increasing the speed of survey vessel 360. As another example, it may be desirable to change the towing depth of source towing system 200 to follow the topography of the sea floor.

At times, it may be desirable to maintain source towing system 200 at a level orientation (i.e., all bender sources 100 at a uniform towing depth). It should be understood that towing forces applied by umbilical cable 313 to source towing system 200 may tend to raise the forward end of source towing system 200 above the aft end thereof. Consequently the orientation may be leveled by one or more of (1) at least partially flooding forward ballast tank 240-F with water, (2) at least partially filling aft ballast tank 240-A with air, and (3) adjusting the exposed surface area of forward control surface structure 250-F to adjust the pitch angle downwards. As would be understood by one of ordinary skill in the art with the benefit of this disclosure, the orientation of source towing system 200 may impact the signal received by the geophysical sensors when the wavelength of the acoustic signal generated by the bender sources 100 is of the order of the size of the source towing system 200.

FIG. 4 illustrates an exemplary method 400 of source towing at depth. The method 400 begins at step 410 wherein a source towing system (such as source towing system 200) is towed through a body of water at a selected towing depth. In some embodiments, the selected towing depth may be between about 50 m and about 150 m. In some embodiments, no surface float is coupled to the source towing system.

The method 400 continues at step 420 wherein a plurality of ballast tanks (such as ballast tanks 240) of the source towing system are operated. For example, the plurality of ballast tanks may be operated as in step 433 to change the buoyancy of the source towing system. In some embodiments, changing the buoyancy of the source towing system includes flooding the plurality of ballast tanks with water to cause the source towing system to sink. In some embodiments, changing the buoyancy of the source towing system includes filling the plurality of ballast tanks with air to cause the source towing system to float.

As another example, the plurality of ballast tanks may be operated as in step 436 to shift a center of mass of the source towing system. In some embodiments, shifting the center of mass of the source towing system includes flooding a first ballast tank from the plurality of ballast tanks with water, wherein the first ballast tank is forward from a neutral center of mass of the source towing system. In some embodiments, shifting the center of mass of the source towing system includes filling a second ballast tank from the plurality of ballast tanks with air, wherein the second ballast tank is aftward from the neutral center of mass of the source towing system.

The method 400 may continue with one or more optional steps. For example, the method 400 may continue at step 442 wherein an exposed surface area of a control surface structure (such as control surface structure 250) is adjusted. In some embodiments, this may result in adjusting a pitch angle of the source towing system and/or adjusting a yaw angle of the source towing system. In some embodiments, both a forward control surface structure (such as forward control surface structure 250-F) and a side control surface structure (such as side control surface structure 250-S) may be adjusted.

As another example, the method 400 may continue at step 444 wherein a low-frequency acoustic signal is generated. In some embodiments, the low-frequency acoustic signal may be generated by one or more geophysical sources (such as bender source 100) on the source towing system. In some embodiments, the low-frequency acoustic signal may be generated by one or more geophysical sources (such as conventional energy source 326) not on the source towing system. Step 444 (generating a low-frequency acoustic signal) may occur simultaneously with step 420 (operating a plurality of ballast tanks) and/or step 442 (adjusting a control surface structure).

As another example, the method 400 may continue at step 446 wherein a geophysical data product is manufactured. Geophysical data may be acquired during geophysical survey operations utilizing the source towing system. Such geophysical data may be processed to produce a geophysical data product. The geophysical data product may be recorded on a tangible, non-volatile computer-readable medium suitable for importing onshore.

While the foregoing is directed to embodiments of the present invention, other and further embodiments of the invention may be devised without departing from the basic scope thereof, and the scope thereof is determined by the claims that follow.

The invention claimed is:

1. A survey system comprising:
   a source towing system comprising:
   a housing;
   a first geophysical source disposed in the housing so that the first geophysical source is partially exposed to a surrounding environment and able to generate an acoustic signal in the surrounding environment; and
   a plurality of ballast tanks coupled to the housing and configured to at least one of:
   change a buoyancy of the source towing system; and
   shift a center of mass of the source towing system; and
   a survey vessel, wherein:
   the survey vessel is configured to tow the source towing system, and
   aside from the survey vessel, the source towing system is not coupled to a surface float.

2. The survey system of claim 1, wherein the plurality of ballast tanks are configured to change the buoyancy of the source towing system by at least one of:
   flooding the plurality of ballast tanks with water to cause the source towing system to sink; and
   filling the plurality of ballast tanks with air to cause the source towing system to float.

3. The survey system of claim 1, further comprising a second geophysical source disposed in the housing, wherein the first geophysical source is forward from the second geophysical source.

4. The survey system of claim 1, wherein the first geophysical source is at least one of a bender source and a low-frequency source.

5. The survey system of claim 1, further comprising a first control surface structure.

6. The survey system of claim 5, wherein an exposed surface area of the first control surface structure is adjustable in at least one aspect selected from the following:
   a facing direction of the exposed surface area,
   an articulation angle of the exposed surface area, and
   a curvature of the exposed surface area.

7. The survey system of claim 5, further comprising a second control surface structure, wherein the first control surface structure is a forward control surface structure, and the second control surface structure is a side control surface structure.

8. A method of towing a geophysical source comprising:
   towing a source towing system through a body of water at a towing depth;
   generating an acoustic signal in the body of water with the geophysical source; and
   operating a plurality of ballast tanks of the source towing system to at least one of:
   change a buoyancy of the source towing system; and
   shift a center of mass of the source towing system,
   wherein:
   the source towing system is towed by a survey vessel, and
   aside from the survey vessel, towing the source towing system does not utilize a surface float coupled to the source towing system.

9. The method of towing a geophysical source of claim 8, wherein the towing depth is between about 50 m and about 150 m.

10. The method of towing a geophysical source of claim 8, wherein changing the buoyancy of the source towing system comprises at least one of:
   at least partially flooding the plurality of ballast tanks with water to cause the source towing system to sink; and
   at least partially filling the plurality of ballast tanks with air to cause the source towing system to float.

11. The method of towing a geophysical source of claim 8, further comprising generating a low-frequency acoustic signal with the geophysical source.

12. The method of towing a geophysical source of claim 11, wherein the source towing system comprises a plurality of geophysical sources, and generating the low-frequency acoustic signal comprises generating acoustic signals with each of the plurality of geophysical sources.

13. The method of towing a geophysical source of claim 11, wherein operating the plurality of ballast tanks and generating the low-frequency acoustic signal occur simultaneously.

14. The method of towing a geophysical source of claim 8, further comprising adjusting a first exposed surface area of a first control surface structure in at least one aspect selected from the following:
   a facing direction of the exposed surface area,
   an articulation angle of the exposed surface area, and
   a curvature of the exposed surface area.

15. The method of towing a geophysical source of claim 14, wherein adjusting the first exposed surface area results in at least one of:
   adjusting a pitch angle of the source towing system; and
   adjusting a yaw angle of the source towing system.

16. The method of towing a geophysical source of claim 14, further comprising adjusting a second exposed surface area of a second control surface structure, wherein the first control surface structure is a forward control surface structure, and the second control surface structure is a side control surface structure.

17. The method of towing a geophysical source of claim 14, further comprising generating a low-frequency acoustic signal with the geophysical source simultaneously with the adjusting the first exposed surface area of the first control surface structure.

18. The method of towing a geophysical source of claim 8, further comprising at least one of:
   adjusting a length of an umbilical cable coupled between the source towing system and a winch on the survey vessel; and
   adjusting a speed of the survey vessel.

19. A method of manufacturing a geophysical data product, the method comprising:
   towing the geophysical source over a subterranean formation with the method of claim 8;
   acquiring geophysical data with a plurality of geophysical sensors;
   processing the geophysical data to produce a seismic image of the subterranean formation; and
   recording the seismic image on one or more non-transitory computer-readable media, thereby creating the geophysical data product.

20. The method of claim 19, further comprising importing onshore the geophysical data product.

* * * * *